United States Patent
Cushing et al.

(10) Patent No.: US 9,081,849 B2
(45) Date of Patent: Jul. 14, 2015

(54) SYSTEM AND METHOD OF MULTIDIMENSIONAL QUERY RESULTS PROCESSING

(75) Inventors: David Cushing, Osgoode (CA); Marius Cosma, Kanata (CA); Neil Warner, Orleans (CA); Helmut Beffert, Chelsea (CA)

(73) Assignee: International Business Machines Corporation, Armonk, NY (US)

( * ) Notice: Subject to any disclaimer, the term of this patent is extended or adjusted under 35 U.S.C. 154(b) by 2156 days.

(21) Appl. No.: 10/855,818

(22) Filed: May 27, 2004

(65) Prior Publication Data

US 2005/0010566 A1    Jan. 13, 2005

(30) Foreign Application Priority Data

May 27, 2003  (CA) ..................................... 2429909

(51) Int. Cl.
  *G06F 17/00* (2006.01)
  *G06F 17/30* (2006.01)
(52) U.S. Cl.
  CPC .... *G06F 17/30604* (2013.01); *G06F 17/30392* (2013.01); *G06F 17/30592* (2013.01); *G06F 17/30955* (2013.01)
(58) Field of Classification Search
  USPC .......................... 707/104.1, 204, 10, 100, 765
  See application file for complete search history.

(56) References Cited

U.S. PATENT DOCUMENTS

| 5,347,632 | A | * | 9/1994 | Filepp et al. .................. 709/202 |
| 5,701,466 | A | | 12/1997 | Young et al. |
| 6,272,493 | B1 | * | 8/2001 | Pasquali ........................ 709/219 |
| 6,377,945 | B1 | * | 4/2002 | Risvik ..................................... 1/1 |
| 6,470,344 | B1 | * | 10/2002 | Kothuri et al. ................ 707/696 |
| 2002/0059195 | A1 | * | 5/2002 | Cras et al. .......................... 707/3 |
| 2002/0091681 | A1 | * | 7/2002 | Cras et al. .......................... 707/3 |
| 2002/0116417 | A1 | * | 8/2002 | Weinberg et al. ............. 707/517 |
| 2003/0116417 | A1 | * | 6/2003 | DeReus ........................ 200/181 |
| 2003/0182272 | A1 | * | 9/2003 | Leung et al. ...................... 707/3 |

(Continued)

FOREIGN PATENT DOCUMENTS

EP          0 706 140 A       4/1996

OTHER PUBLICATIONS

William Pearson; "Reporting Options for Analysis Services Cubes: MS Excel 2002" Database Journal, Apr. 7, 2003, XP002376434.

(Continued)

*Primary Examiner* — Hosain Alam
*Assistant Examiner* — Eliyah S Harper
(74) *Attorney, Agent, or Firm* — Patterson & Sheridan, LLP (57) ABSTRACT

A multidimensional query results processing system for translating output of an execution of a multidimensional query into a data result set that reflects the semantics of an entity/relationship schema report specification is provided. The system comprises a result set description generation module for producing a result set description that reflects the semantics of the report specification, a tabular row generation module for converting the results of the single multi-dimensional query into a collection of rows of data, a tabular summary level calculation module for calculating a summarization level of a row a data, a tabular header row generation module for producing a header row to include in the row of data, and a cross-tabulated result generation module for converting the results of the single multi-dimensional query into a result set that matches the semantics of the report specification.

9 Claims, 7 Drawing Sheets

(56) References Cited

U.S. PATENT DOCUMENTS

2004/0039759 A1* 2/2004 Detlefs et al. .................. 707/206
2004/0073565 A1* 4/2004 Kaufman et al. ............. 707/101
2004/0148308 A1* 7/2004 Rajan et al. ................... 707/102
2005/0278367 A1* 12/2005 Schiefer et al. ............... 707/101

OTHER PUBLICATIONS

EP Examination Report for Application No. 04-102363.1, dated Feb. 26, 2010.
Thomas Ruf, et al. "Dealing With Complex Reports in OLAP Applications," Lecture Notes in Computer Science, Springer Verlag, DE, vol. 1676, (Jan. 1, 1999) 14 pages.
Examination Report of European Patent Application Serial No. 04 102 363.1 (CA920085064EP1) dated Jun. 27, 2011.
Paulraj Ponniah, "Principles of Dimensional Modeling," Data Warehousing Fundamentals: A Comprehensive Guide for IT Professionals, John Wiley & Sons, Inc., New York, 2001: pp. 203-224.
Author Unknown, "MultiDimensional eXpressions," Retrieved on Jun. 14, 2011: pp. 1-4, <http://en.wikipedia.org/wiki/MultiDimensional_eXpressions>.
Surajit Chaudhuri et al., "An Overview of Data Warehousing and OLAP Technology," ACM SIGMOD, Mar. 1997, vol. 26(1): pp. 65-74.

* cited by examiner

SYSTEM AND METHOD OF MULTIDIMENSIONAL QUERY RESULTS PROCESSING

FIELD OF THE INVENTION

The invention relates to a system and method of multidimensional query results processing.

BACKGROUND OF THE INVENTION

Data warehouses store data in one of two primary locations—relational databases and multi-dimensional, on-line analytical processing (OLAP) data sources. Typically, reporting tools that generate tabular/grouped list, or cross-tabulated reports work with relational databases, or extract data from an OLAP data source and process the data locally. This sort of product architecture is imposed due to the semantic differences between the relational and OLAP data models and the query languages used to access each type of data source. Whereas the relational query language, SQL, is well suited to producing tabular and grouped-list reports, multi-dimensional query languages are more suited to producing cross-tabulated reports for the purpose of analysis and exploration.

Processing OLAP data locally to provide the data for a particular report introduces several less than ideal side effects, including:
  the aggregation capabilities of the OLAP engine are not invoked.
  complex aggregation/calculation rules defined in an OLAP data source are lost.
  calculating values locally may require the retrieval of large amounts of data
  if data is retrieved and processed locally, it is possible that security rules in the OLAP engine are not enforced.

Authoring tabular and cross-tabulated reports based upon OLAP (dimensional) metadata is problematic as well since it introduces concepts not apparent in more common tabular/relational data sources. These concepts include dimensions, hierarchies, levels, properties, and measures.

From the end user's point of view, it is desirable to deal with the more familiar entity/relationship (or the relational) concepts of entities (tables), attributes (columns), and relationships (joins) instead of the more complex dimensional constructs. The entity/relationship model provides a simpler and easier to understand paradigm, as well as consistency in representation regardless of the type of underlying data source.

SUMMARY OF THE INVENTION

It is an object of the present invention to solve one or more of the problems described above.

In accordance with an embodiment of the present invention, there is provided a multidimensional query results processing system for translating output of an execution of a multidimensional query into a data result set that reflects the semantics of an entity/relationship schema report specification. The system comprises a result set description generation module for producing a result set description that reflects the semantics of the report specification, a tabular row generation module for converting the results of the single multidimensional query into a collection of rows of data, a tabular summary level calculation module for calculating a summarization level of a row a data, a tabular header row generation module for producing a header row to include in the row of data, and a cross-tabulated result generation module for converting the results of the single multi-dimensional query into a result set that matches the semantics of the report specification.

In accordance with another embodiment of the present invention, there is provided a method of transforming results of a multidimensional query into results having the semantics of an entity/relationship schema report specification. The method comprises the steps of combining a result set description of a multi-dimensional query and rules of the entity/relationship schema to produce a final result set description, converting results of the multi-dimensional query result set into a collection of rows of data, producing headers for inclusion into the rows of data, and converting results of the multi-dimensional query into a result set that matches the semantics of the entity/relationship report specification.

In accordance with another embodiment of the present invention, there is provided a computer data signal embodied in a carrier wave and representing sequences of instructions which, when executed by a processor, cause the processor to perform a method of transforming results of a multidimensional query into results having the semantics of an entity/relationship schema report specification. The method comprises the steps of combining a result set description of a multi-dimensional query and rules of the entity/relationship schema to produce a final result set description, converting results of the multi-dimensional query result set into a collection of rows of data, producing headers for inclusion into the rows of data, and converting results of the multi-dimensional query into a result set that matches the semantics of the entity/relationship report specification.

In accordance with another embodiment of the present invention, there is provided a computer-readable medium having computer readable code embodied therein for use in the execution in a computer of a method of transforming results of a multidimensional query into results having the semantics of an entity/relationship schema report specification. The method comprising the steps of combining a result set description of a multi-dimensional query and rules of the entity/relationship schema to produce a final result set description, converting results of the multi-dimensional query result set into a collection of rows of data, producing headers for inclusion into the rows of data, and converting results of the multi-dimensional query into a result set that matches the semantics of the entity/relationship report specification.

In accordance with another embodiment of the present invention, there is provided a computer program product for use in the execution in a computer of a multidimensional query results processing system for translating output of an execution of a multidimensional query into a data result set that reflects the semantics of an entity/relationship schema report specification. The computer program product comprises a result set description generation module for producing a result set description that reflects the semantics of the report specification, a tabular row generation module for converting the results of the single multi-dimensional query into a collection of rows of data, a tabular summary level calculation module for calculating a summarization level of a row a data, a tabular header row generation module for producing a header row to include in the row of data, and a cross-tabulated result generation module for converting the results of the single multi-dimensional query into a result set that matches the semantics of the report specification.

DETAILED DESCRIPTION OF THE PREFERRED EMBODIMENTS

Figure 1:
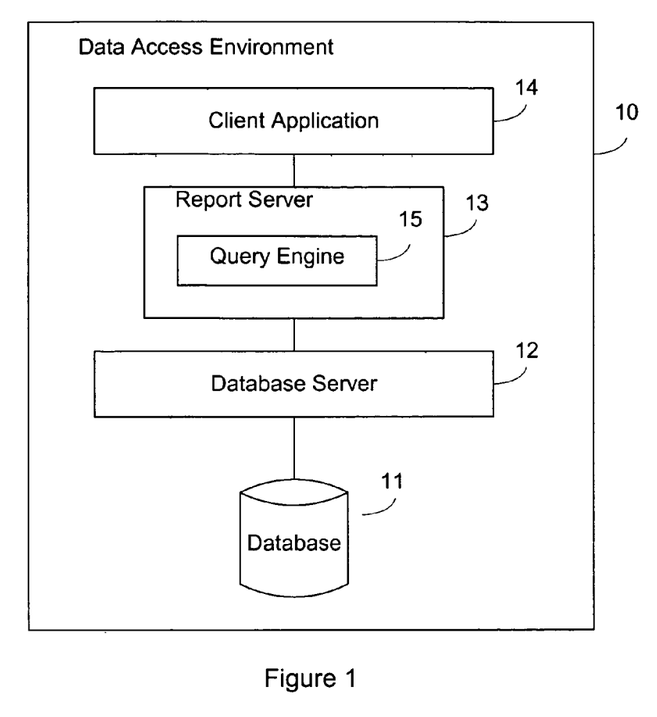
FIG. 1 shows an example of a typical data access environment.

FIG. 1 shows a typical data access environment 10 for processing data. Typically, data is stored in a database 11. A database server 12, e.g., structured query language (SQL) server, accesses the raw data stored in the database 11. A report server 12 is used to generate reports on the raw data and instruct the database server 12 to obtain information pertaining to the raw data in the database 11. An end user uses a client application 14, running on a client server, to facilitate report server 13 operations. Typically, a report server 13 has a query engine 15 for universal data access (UDA).

One embodiment of the present invention provides a mechanism by which the results of a multidimensional query are processed such that their format and contents accurately reflect the semantics of an entity/relationship (E/R) report specification. In addition, a mechanism may be provided such that tabular and cross-tabulated reports may be executed using an online analytical programming (OLAP) query language using an E/R representation of the OLAP metadata without the necessity of local processing, thus obtaining the benefit of the OLAP aggregation engine, the data source's complex aggregation rules, and minimal data transfer from the OLAP data source to the client reporting application.

Figure 2:
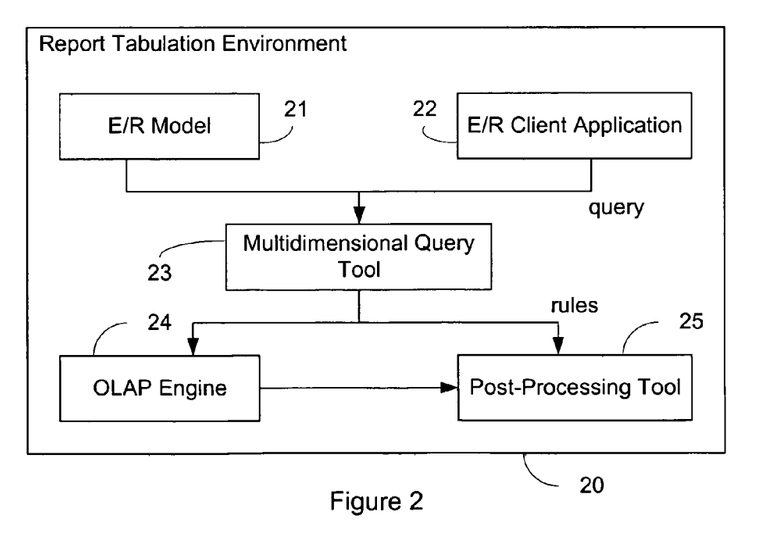
FIG. 2 shows a report tabulation environment, in accordance with an embodiment of the present invention.

FIG. 2 shows a report tabulation environment 20, in accordance with an embodiment of the present invention. The report tabulation environment 20 includes an E/R model 21, an E/R client application 22, a multidimensional query tool 23, an OLAP engine 24, and a post-processing tool 25. A report/query is generated from the E/R client application 22. The report is requested based upon the schema of the E/R model 21. However, the data (not shown) is stored in an OLAP format and is processed by the OLAP engine 24. The multidimensional query tool 23 receives the query from the E/R client application 22 and the E/R schema E/R model 21. The query is then converted into a multi-dimensional expression query that can be executed by the OLAP engine 24. The post-processing tool 25 processes the results of the multi-dimensional expression query execution.

Tabular and cross-tabulated reports have characteristics that are independent of the manner in which they are produced and are described below.

Layout.
The order in which columns appear in a tabular report. In a cross tabulated report, this also includes the edge of the cross tab on which columns appear.

Sorting.
Rows can be sorted by columns, the left-most columns sorting first, following in a left-to-right nesting of sorts. Columns may be sorted in either ascending or descending order.

Calculations.
A calculation is expressions evaluated during the execution of the report and, once defined, have the same semantics as an attribute defined in the E/R schema.

Filters.
Filters are conditional expressions used to refine/restrict the data appearing in a report.

Grouping.
Grouping based on attributes within a report places the data into a hierarchy of levels and introduces aggregation of fact values at different levels of summarization.

Association.
When grouping data, some attributes may not form the basis of grouping, but are associated with a grouping attribute. This affects the manner in which these values are rendered and possibly the manner in which the values of such attributes are returned, i.e., once per group as opposed to once for each value (row) within a group.

Dimensionality.
Grouping and association are functionally equivalent to the definition of a single hierarchy within a single dimension. An extension of this is the definition of multiple such definitions, that is, the definition of two or more dimensional hierarchies for use within a single report.

Aggregation.
This defines the way in which individual facts are aggregated. Aggregation may be defined for a fact to be performed before or after the application of filters.

Summary Values.
An indication of whether or not facts should be summarized for a grouping of columns. Summary values may appear as headers (before rows of the group), footers (after rows of the group), or as both.

Set Operations.
Set operations allow the creation of a report specification by applying the set operators (union, difference, intersect) to two separate report specifications.

These constructs are then applied in combinations to the entities and attributes in an entity/relationship (E/R) model 21 to produce a report (query) specification.

The multi-dimensional constructs can be mapped to the E/R model 21 such that an E/R schema derived from an OLAP data source may act as the basis for the production of tabular and cross-tabulated reports. One example of such a mapping is defined as follows and presents the OLAP metadata as a star schema. Though other mappings are possible, all mappings can be shown to be equivalent representations of what is described below.

| Dimensional Construct | E/R Construct | Notes |
|---|---|---|
| Cube | Schema | |
| Dimension | <None> | Represents a logical grouping of entities. |
| Measure Dimension | Entity | One fact entity for each set of identically scoped measures. |
| Hierarchy | Entity | |

-continued

| Dimensional Construct | E/R Construct | Notes |
|---|---|---|
| Level | Attribute | |
| Property | Attribute | Associated with a level attribute. |
| Measure (member of the measure dimension) | Attribute | Attribute in entity representing the fact table (entity) in a star schema. |
| <None> | Relationship | Represents the manner in which the fact entity is related to the other entities (dimensional hierarchies) in the schema. |

An E/R schema derived from an OLAP data source associates with the objects in the schema additional physical metadata providing the mapping from logical E/R objects to their corresponding objects in the OLAP data source. Some of this information is required, while other pieces of it are optional and are applicable for query optimization (discussed later), as indicated below.

| E/R Construct | Associated OLAP Metadata | Mandatory? |
|---|---|---|
| Schema | Cube unique name | Yes. |
| Entity (Non-Fact) | Dimension/Hierarchy unique name | Yes. |
| | Balanced hierarchy? | No. |
| | Ragged hierarchy? | No. |
| | Multiple members at root level? | No. |
| Entity (Fact) | Fact table indication | Yes. |
| Attribute (Level, Non-Fact) | Level identifier indication | Yes. |
| | Level number | Yes. |
| | Level unique name | Yes. |
| Attribute (Property, Non-Fact) | Level number | Yes. |
| | Property unique name | Yes. |
| Attribute (Fact) | Aggregator | Yes. |
| | Semi-aggregator | Yes. |
| | Measure unique name | Yes. |
| | Data type | Yes. |
| | Parent unique name | Yes, if measure dimension contains hierarchies. |

Once a report has been authored using the E/R schema as its basis, the report specification is converted, using the same E/R schema, to produce a single OLAP (MDX) query containing all of the data associated from which the data to satisfy the original report may be obtained.

Note that though MDX is only one of several methods available for querying multi-dimensional data stores, it is the de facto standard for such operations. Several vendors support their own API, but also provide support for MDX. In those cases where a vendor-supplied MDX interface is not available, it is possible for an MDX interface to be constructed that in translates an MDX query into the native query interface. Hence, using MDX as the basis for specifying OLAP query semantics is applicable to all available OLAP data sources.

One embodiment of the invention provides a system of converting basic business report specifications into a single OLAP (MDX) query that can be issued to an underlying OLAP data source, as well as processing the results of the MDX query to product the results in a format consistent with the original report specification.

Figure 3:
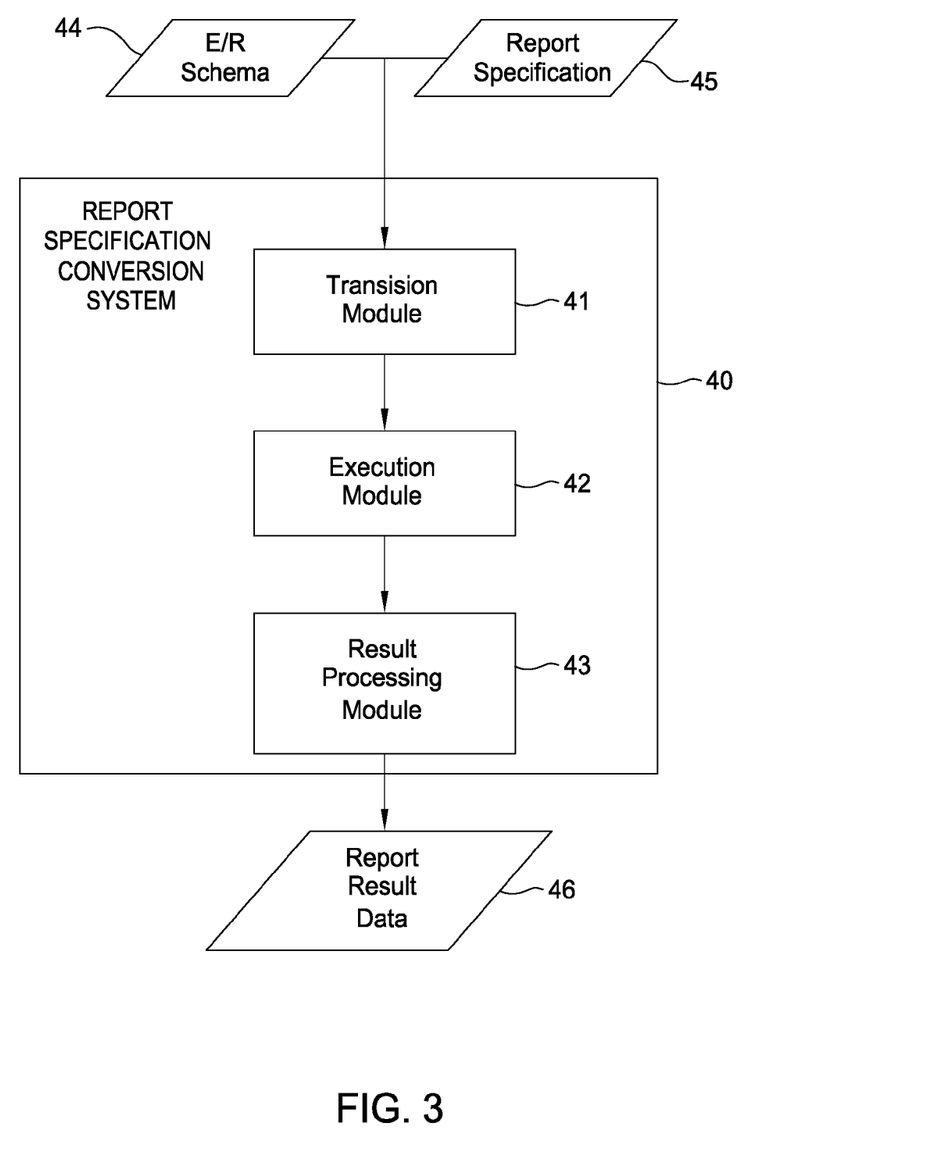
FIG. 3 shows an example of a report specification conversion system, in accordance with an embodiment of the present invention.

FIG. 3 shows an example of a report specification conversion system, in accordance with an embodiment of the present invention. The basic system consists of the following modules:

1. Translation Module 41

The translation module 41 accepts as input a tabular or cross-tabulated report in a form recognized by the translation module 41 and using constructs as described above in this document to describe the semantics of the report, as well as the E/R schema 44 used as the basis for the report 45. The objects within the E/R schema 44 are adorned with metadata providing a mapping to an underlying multi-dimensional data source, as described above.

The translation module 41 converts a report specification 45 and the information in the E/R schema 44 to generate a single MDX query that represents the semantics of the original report specification 45 and produces a result set 46 in a manner such that the result processing module 43 can generate the set of data corresponding to the original report specification 45.

In addition, the translation module 41 generates information for use by the result-processing module 43.

2. Execution Module 42

The execution module 42 executes the MDX query in the underlying multi-dimensional data source and produces a single multi-dimensional dataset.

3. Result Processing Module 43

The result processing module 43 uses the information generated by the translation module 41 to convert the multi-dimensional dataset into a result set 46 that reflects the original report specification's 45 semantics.

The report specification conversion system 40 may be implemented as a stand-alone module or system that can be added to a reporting application on the application server 12, the report server 13, the query engine 15, or the database server 14.

One aspect of the present invention provides a post-processing system having reporting capabilities to provide universal data access that is transparent to the end user. That is, the person using such a reporting tool does not need to be aware of where the data is located or how the data is stored. The end user should not care about the manner in which data is physically stored (e.g., relational database, network database) or the manner in which it is logically stored (e.g., separate tables, networked constructs).

One example of a post-processing system is the result processing module 43 that converts a multi-dimensional data set into a result set that reflects the semantics of an E/R report specification. The post-processing system may be implemented as a stand-alone module or system that can be added to the application server 12, the report server 13, the query engine 15, or the database server 14. Alternatively, the post-processing system may be implemented as a module of the report specification conversion system 40.

The post-processing system provides a singular view of a collection of heterogeneous data sources. A user can then author reports in a consistent fashion without regards to the physical or logical constraints or differences of the underlying data sources. Such reports require the execution of one or more data source specific queries, each possibly specified in a language/semantics specific to that data source.

The results of the data source specific queries can be returned in a variety of formats, depending upon the capabilities and characteristics of the underlying data sources. The results of these queries must be formulated into a single result set that reflects the original semantics of the user's query.

Three software components can be produced individually, each performing a specific task, that combined provide the backbone of a heterogeneous reporting application. Those components are:

Modeling
Query Generation
Result Transformation

Each of these components can be devised to deal with one or more of the possible combinations of data sources, model representations, and report types. For example:

- A modeling component may choose to support network (CODASYL) data sources and model them in an entity-relationship model.
- A query generation component may choose to support the translation of queries posed against an entity-relationship model into CODASYL queries.
- A result transformation component may choose to support the transformation of CODASYL query results into tabular results.

With the use of an agreed upon set of application programming interfaces (APIs) for each of these components (or barring that, the introduction of software to perform the necessary transformations from one API to another), these components may form the basis of a post-processing reporting system. The more capabilities supported by a particular component, or the more variety of such tools used by a particular application, the larger the variety of data sources, models, queries and results supported by the application.

Described below is the result transformations to convert the results of a single OLAP (MDX) query into a tabular or cross tabulated report based upon a set of supplied directives on how to process the results of the OLAP query.

Figure 4:
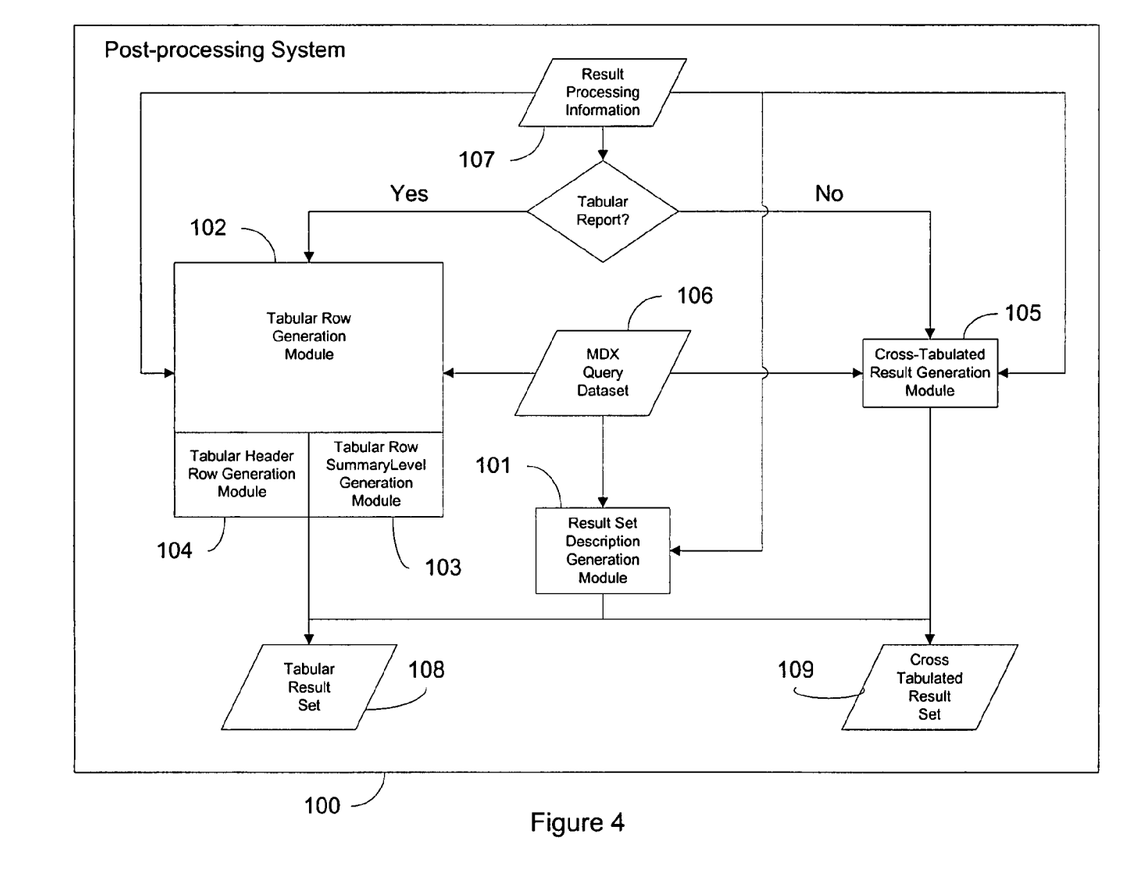
FIG. 4 shows an example of the result processing system, in accordance with an embodiment of the present invention.

FIG. 4 shows an example of the post-processing system 100, in accordance with an embodiment of the present invention. The post-processing system 100 comprises the following modules:

1. Result Set Description Generation Module 101

This module 101 takes as input the result set 106 description from the execution of an MDX query by an underlying multi-dimensional data source and, using result processing information 107, produces a result set 108 description for a result set that is generated by the post-processing system 100, which in turn reflects the semantics of an original report specification. The result processing information 107 may be provided to the result processing module 43 as a set of rules, or alternatively, generated by the translation module 41.

2. Tabular Row Generation Module 102

This module 102 converts the results of a multi-dimensional result set (referred to in the OLE DB for OLAP specification as a dataset) into a collection of rows of data.

3. Tabular Summary Level Calculation Module 103

This module 103 calculates the summarization level (described below) of each row of data in the rowset generated by the tabular row generation module 102.

4. Tabular Header Row Generation Module 104

This module 104 produces header rows (described below) for inclusion in the rows of data produced by the tabular row generation module 102.

5. Cross-Tabulated Result Generation Module 105

This module 105 converts the results of the execution of the MDX query into a cross-tabulated result set 109 that matches the semantics of the original query specification. In the case of cross-tabulated reports, the data from the MDX query closely resembles the original query specification and requires processing to align the metadata and layout with the original specification.

Figure 5:
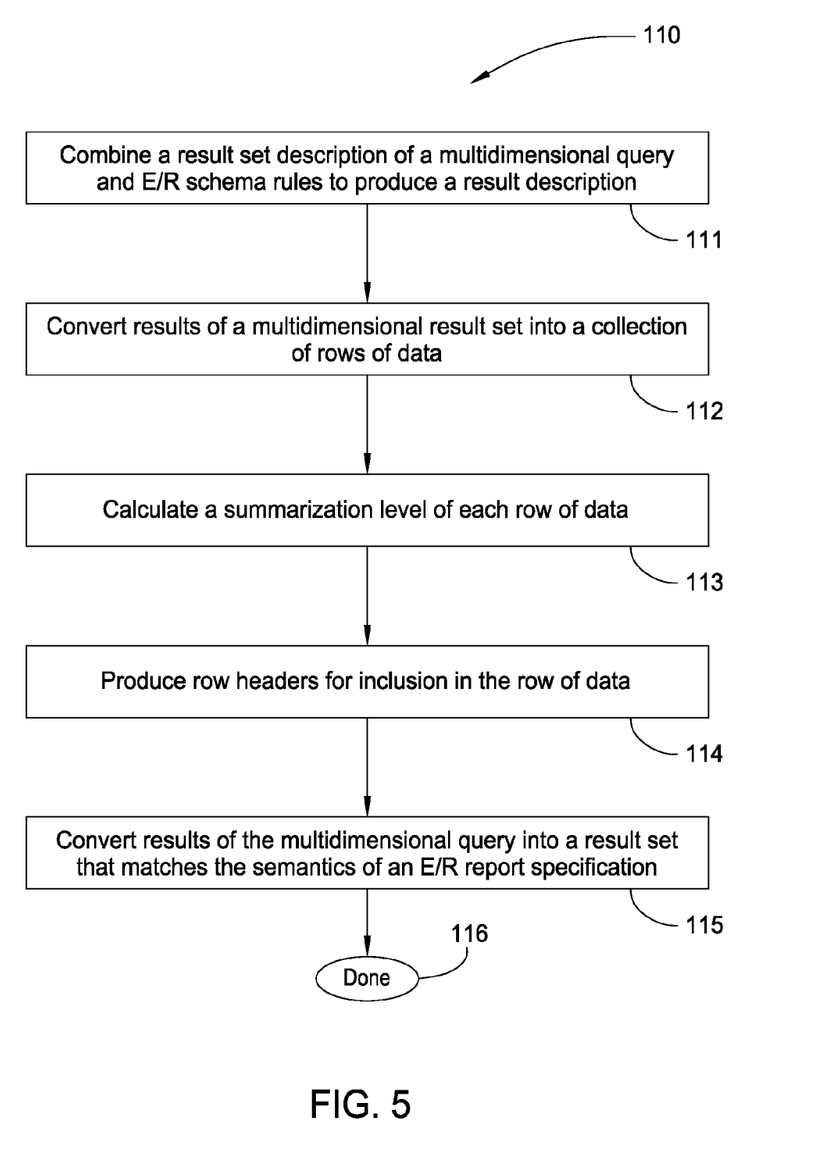
FIG. 5 shows in a flowchart an example of a method of converting a multi-dimensional dataset into a result set that reflects the semantics of an E/R report specification, in accordance with an embodiment of the result processing system.

FIG. 5 shows in a flowchart an example of a method of converting a multi-dimensional dataset into a result set that reflects the semantics of an E/R report specification (110), in accordance with the post-processing system 100. The method (110) begins with combining a result set description of a multidimensional query and E/R schema rules to produce a result set description (111). The post-processing system 100 may provide the E/R schema rules. Next, results of the multidimensional result set are converted into a collection of rows of data (112). Next, a summarizaton level of each row of data is calculated (113). Next, row headers are produced for inclusion in the rows of data (114). Finally, the results of a multi-dimensional query are converted into a result set that matches the semantics of an E/R report specification (115). The method is done (116). Other steps may be added to the method (110).

Further description of concepts and examples of algorithms or methods used by the result processing module 43 are described below.

Data for tabular reports may be returned in a variety of formats, all of which return the same information. The following specification is representative of the format in which data is returned for tabular and cross-tabulated queries and forms the basis for the description of how data from multi-dimensional queries (which return data in a the cross-tabular format themselves) is converted into a representation that reflects the semantics of the original report specification.

Tabular

The data of a tabular query may be represented by a single rowset that contains zero or more rows of data, each containing 1 or more columns. In addition, each row provides:

An indication as to which grouping in the report specification a row of data pertains:

Overall report summary, indicated by 0.

Group summary. The inner (right-most) group in a report specification has the lowest number, starting at 1.

Detail (no summarization), indicated by −1.

For all summary rows, an indication of whether the row represents a header or footer value (default is footer).

Each column contains a data value and a status indicator (OK, NOT_APPLICABLE, NULL, etc.).

Cross-Tabulated

The data of a cross-tabulated query may be represented by:

A collection of metadata

One or more edges, each containing additional metadata and a single rowset

Another rowset containing cell data.

Each edge rowset contains the following columns:

A default collection of columns for each dimension that appears crossjoin'ed along the edge in the report specification. These columns are:

Member unique name
Caption
Level unique name
Level number
Parent unique name
Next member is parent (parent/child) information
Drilled, same parent as previous Appended to the default columns of each dimension is a collection of zero or more columns, one for each dimension-specific property specified in the report specification.

Each row in the rowset has associated with an ordinal position along the edge, starting at 0.

The cell rowset contains a column containing a cell's value, and a column for each edge of the report specification, containing the ordinal position for that edge that corresponds to the cell value in each row.

If any dimension in the underlying data source is not specified in the report specification, the default member from each dimension appears in a special edge, commonly referred to as the "slicer", in an edge rowset constructed exactly the same as the other edges in the result set.

Use the metadata from query generator and the result set metadata (not data) to construct the metadata for the result set returned to the client:

Tabular Report
  An array of objects describing each column of the result set, including the summarization level associated with each column.
  Result set description object, the array of column descriptions.
Cross-Tabulated Report
  For each dimension that appears in the report output, an object describing the columns associated with the dimension, as well as a description of the levels of the dimension present in the report output.
  For each edge, an array of dimension description objects.
  A result set description object containing an array of edge description objects.
Tabular Report Processing The result set processing module, when processing tabular reports, operates upon a multi-dimensional dataset in which all non-fact dimensions are nested along a single dimension and all facts, if any, involved in the query appear along a separate edge. Overall summary values for any grouping level within the report specification appear in the result set as members with a pre-defined name known to the result set processing module. For the purposes of discussion, call it "overall value".

In the presence of non-fact attributes in a report, the tabular report-processing module traverses the non-fact edge of the multi-dimensional result set and pushes level identifiers (members) onto a stack in the manner described below. When the stack contains the same number of members as the number of levels referenced by the original report specification (upon its initial binding to the multi-dimensional metadata), a row of data is available for possible inclusion in the final result set and for calculation of its summary level.

Figure 6:
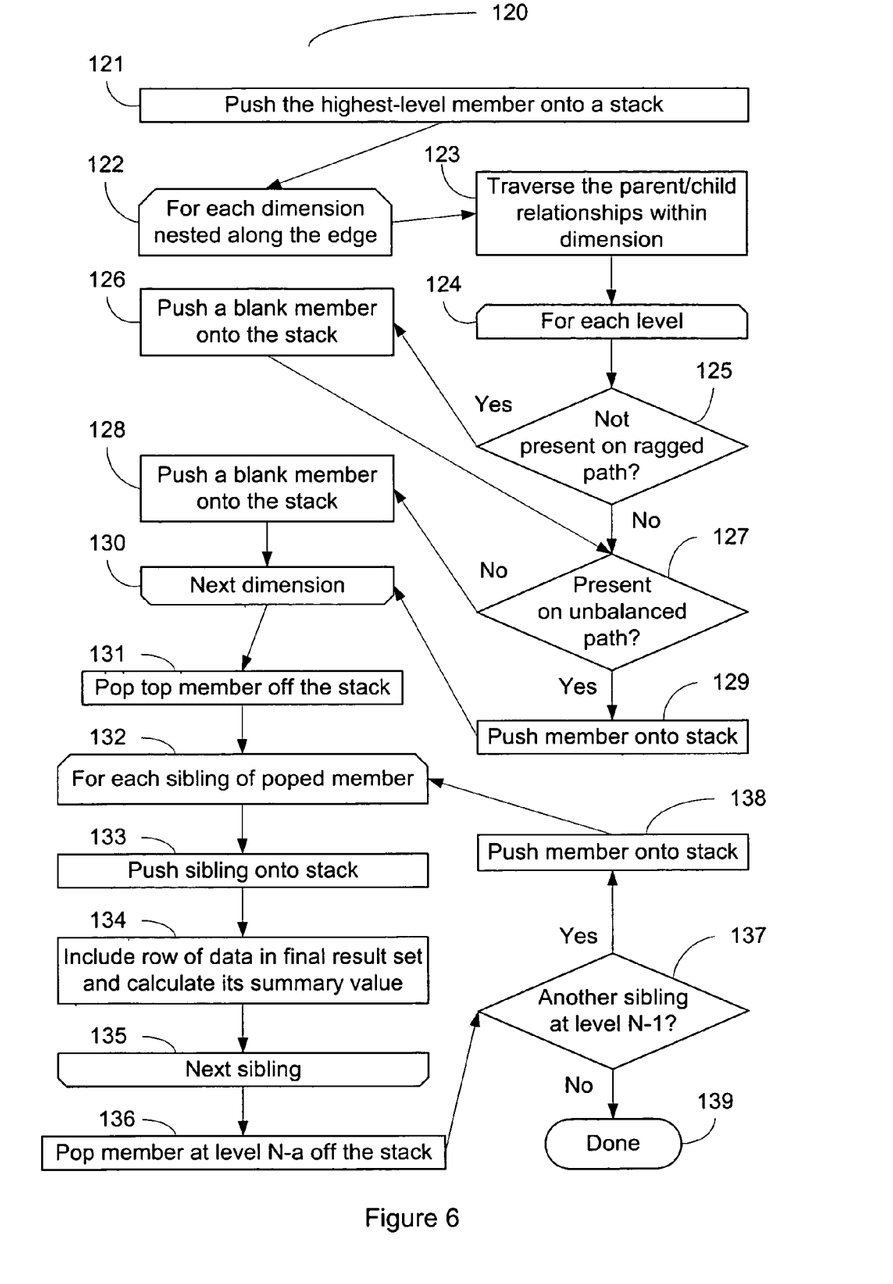
FIG. 6 shows in a flowchart an example of a method of producing a "full" stack of members representing a possible row of data, in accordance with an embodiment of the report processing system.

FIG. 6 shows in a flowchart an example of a method of producing a "full" stack of members representing a possible row of data, in accordance with an embodiment of the report processing module 43. The method (120) comprises the following steps:

1. From the current position within the multi-dimensional edge rowset, push the highest-level member onto a stack (121).
2. Traverse the parent/child relationships within a dimension along the edge (123). At each level (124), push the member at that level (which includes references to its member property values) onto the stack (129).
3. A ragged path within the hierarchy of a result set is one in which the difference in the level ordinals of a parent/descendant pair is more than expected based on the query specification.
   If a ragged path is encountered while traversing the result dataset (125), the algorithm pushes a blank member onto the stack (126) for each level from the report specification that is not present in the path.
4. An unbalanced path within the hierarchy of a result set is one in which the path does not descend to the lowest level of the dimension as specified in the report specification.
   If an unbalanced path is encountered while traversing the result dataset (127), the algorithm pushes a blank member onto the stack for each level from the report specification that is not present in the path (128).
5. Perform steps 2, 3 and 4 for each dimension nested along the edge (122) until there are no more dimensions to traverse (130).
6. When the last nested dimension has been reached (130) and its members pushed on the stack, this represents a row of data that can possibly be included in the final result set and its summary value calculated (134), as described below.
7. Pop the top member off the stack (131). If there is a sibling of the member just popped off the stack (132), push the sibling onto the stack (133) and perform step 6 (134).
8. Perform step 7 until all siblings have been processed at that level (135).
9. When all of the siblings at level N are exhausted (135), the member at level N−1 is popped of the stack (136). If there is another sibling at level N−1 (137), this member is pushed on the stack (138) and steps 6 to 8 (131 to 134) are repeated until there are no members remaining in the edge rowset.

Summary Values

Summary values for rows are calculated by the following mechanism:

Each element in the stack contains the following information:
  1. Type of element (Normal, Gapped Filler, Ragged Filler, or Nested Dimension Filler).
  2. State (CheckHeaderNested, CheckHeaderCurrent, CheckHeaderDone, CheckChildren, CheckNested, CheckCurrent, CheckSiblings, CheckAncestor).
  3. Whether the element represents a generated overall node.
  4. MDX Dimension (links with Post Processing Rules).
  5. MDX Level (links with Post Processing Rules).
  6. Level Ordinal (sibling number within MDX Level (5)).

Elements go through the following state sequences. The states within in braces are optional.

[CheckHeaderNested→CheckHeaderCurrent→Check HeaderDone]
  →CheckChildren→CheckNested→CheckCurrent
  [→CheckSiblings]→CheckAncestor The various CheckHeader states are not in effect if no headers are required.

CheckSiblings is not performed if CheckCurrent determines that all of the siblings would result in the same unwanted summary level.

Only the CheckHeaderCurrent and CheckCurrent states can result in the stack representing a desired row.

To determine header information and summary level, the stack is logically divided into dimensions.

```
/--------------1-----------\   /-------2-------\
+-----+ +-----+ +-----+    +-----+ +-----+
|   | |   | |   | |    |   | | |   | ..
+-----+ +-----+ +-----+    +-----+ +-----+

/-----------------n---------------\
+-----+ +-----+ +-----+ +-----+
|   | |   | |   | |   | |   |
+-----+ +-----+ +-----+ +-----+
```

Rule 1

If there are only 'Normal' elements in the stack which match the number of columns in the report (not including generated overall nodes), it is a detail row. (Summary Level=−1).

Rule 2

If every dimension has only a single 'Normal' element, this is the overall row (Summary Level=0)

Rule 3

Determine the summarization of each dimension. A dimension is summarized if there are Nested Dimension Fillers in the dimension set.

1. The Dimension of interest is the inner-most summarized dimension prior to the first non-summarized dimension.
2. If there is a summarized dimension following a non-summarized dimension, it is a cross-joined aggregation and the stack does not represent a desired row Consider the following Stacks (Nested Dimension Fillers represented by X):

No dimensions are summarized. This is a detail row (Summery Level=−1) (by Rule 1)

Overall Summary Level (One 'Normal' element per dimension ) (by Rule 2)

Dimension 2 is summarized (inner-most summarized dimension) (By Rule 3a)

Dimension 1 is summarized, but the row doesn't represent a desired row since dimension 3 is also summarized. (By Rule 3b)

Once the summarized dimension is determined, The MDX Dim and MDX Level of the inner-most non-Nested Dimension Filler within the dimension is looked up in the post-processing rules to determine the Summery Level for this column.

If the column is grouped, the stack represents a row of interest:

If not, and the inner-most Non Nested Dimension Filler is a generated overall node, check the Post Processing Rules for the previous dimension.

Header Rows

Figure 7:
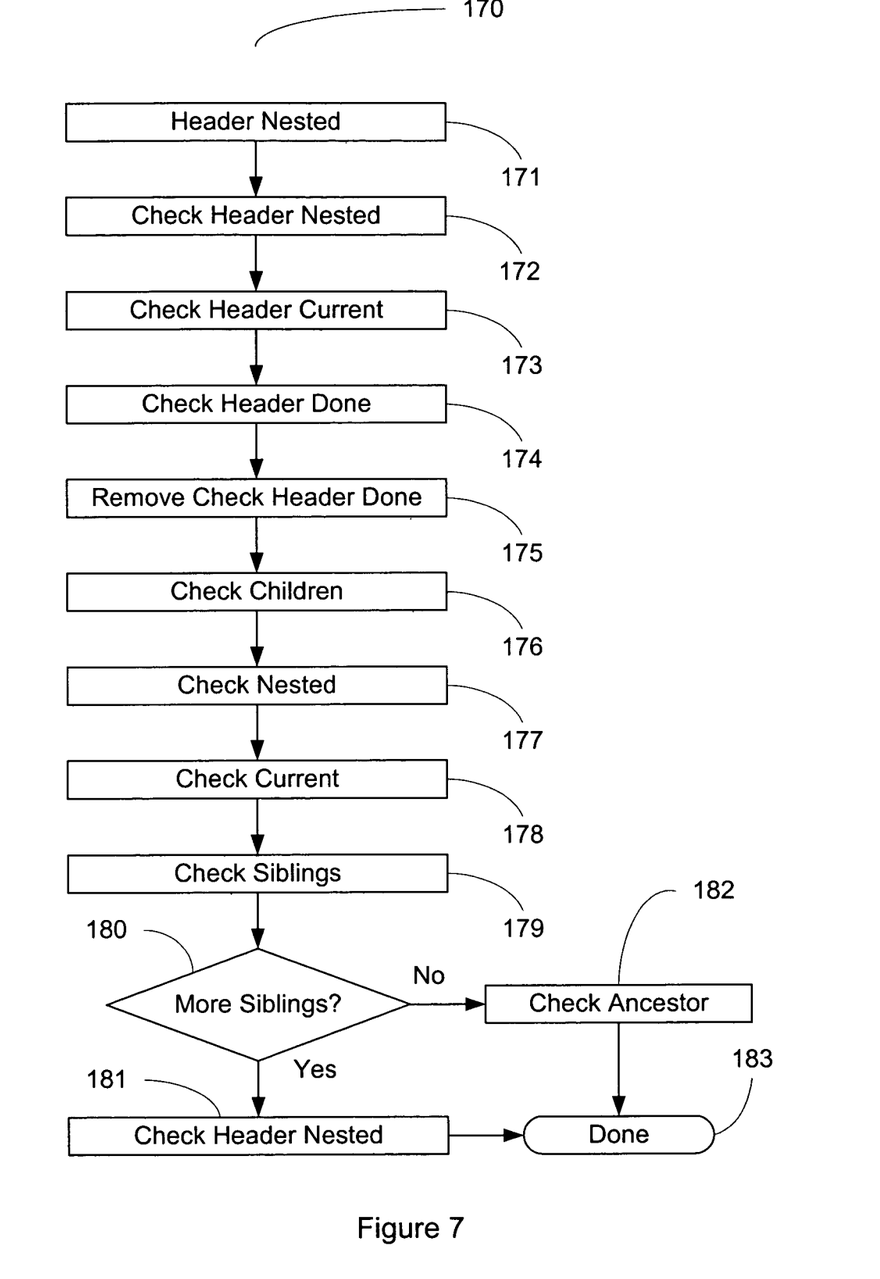
FIG. 7 shows in a flowchart an example of a method of creating header rows, in accordance with an embodiment of the result processing system.
Figure 8:
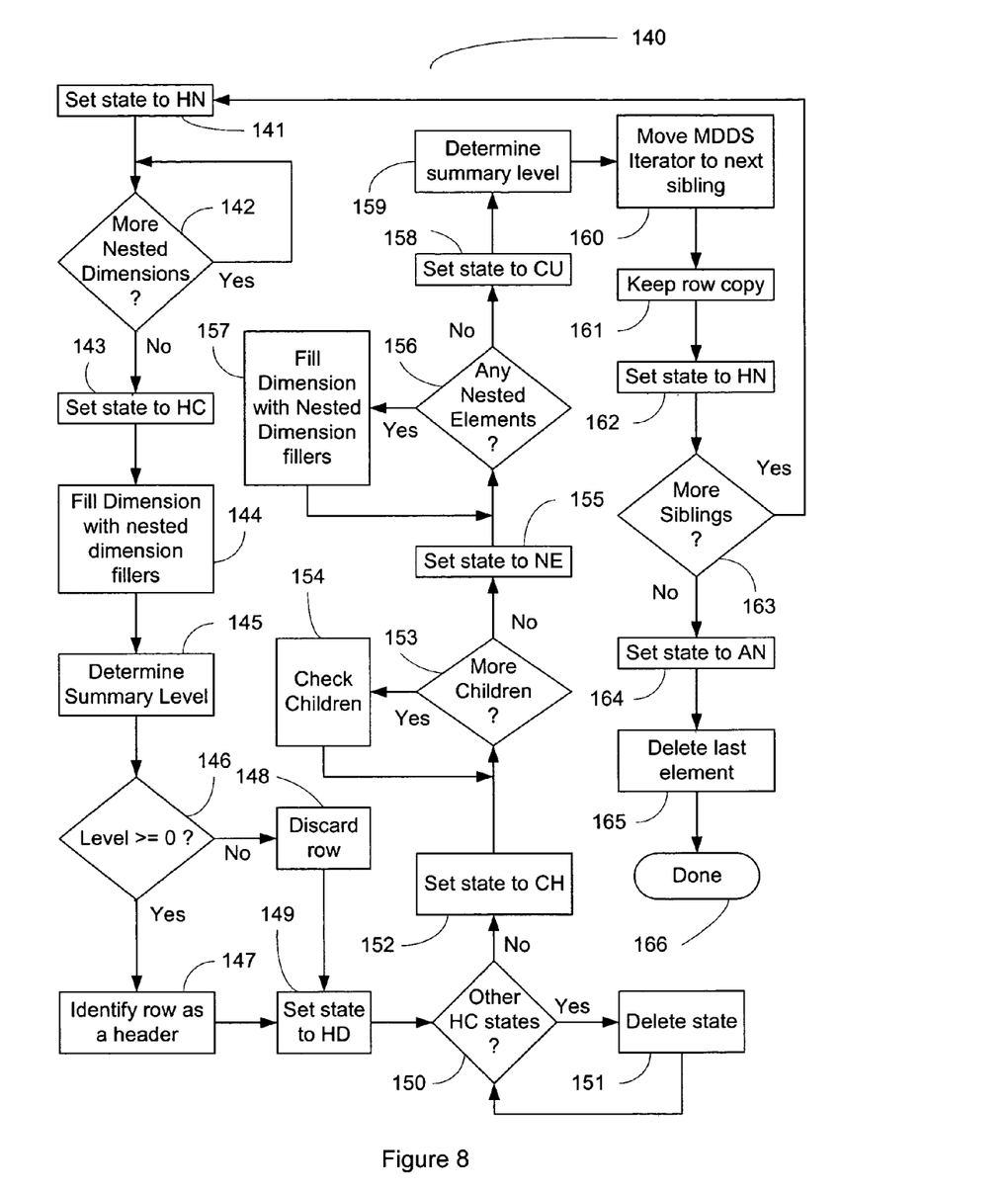
FIG. 8 shows in a flowchart another example of a method of creating header rows, in accordance with an embodiment of the result processing system.

FIGS. 7 and 8 show in flowcharts examples of a method of creating header rows (170 and 140), in accordance with an embodiment of the result processing module 43. Header rows are created by the following mechanism:

Stack states are represents as follows:

HN
   Check Header Nested
HC
   Check Header Current
HD
   Check Header Done
CH
   Check Children
NE
   Check Nested
CU
   Check Current
SI
   Check Siblings
AN
   Check Ancestor Step 1

Header Nested (171): Set the state to Header Nested (141) and check for nested dimensions (142) until there are no more.

Step 2

Check Header Nested (172): Continue to check nested dimensions (142) until there are no more. Set the state to Check Header Current (143) when there is no more nested to be done. The dimension is filled with the required number of Nested Dimension Fillers (144) to ensure the dimension is 'full' before moving onto the next inner dimension.

Step 3

Check Header Current (173): Determine the summary level (145) in the same manner as described below. If the summary level is >=0 (146), the row represents a header and must be identified as such (147) in the tabular result in some manner, possibly a Boolean property. Otherwise, discard row (148) and continue. Set the element state to Header Done (149).

```
      /-------------1-------------\    /-----2-----\
      +-----+ +-----+ +-----+ +-----+ +-----+
      | HC |  |    |  |    |  |    |  | HC |
      +-----+ +-----+ +-----+ +-----+ +-----+
```

Step 4
Check Header Done (174): This state is transitory. It is only possible to move to the next state after the client has issued a Nexto to move from the header row. It simply deletes itself (151), if there are other Check Header Current states in the stack (150) or sets the last element to Check Children (152) if not (150).

```
      /-------------1-------------\    /-----2-----\
      +-----+ +-----+ +-----+ +-----+ +-----+
      | HC |  |    |  |    |  |    |  | HD |
      +-----+ +-----+ +-----+ +-----+ +-----+
```

Step 5
Since all Nested Dimension Fillers are removed from stack, remove this Check Header Done element (175) will cause all but the first element to remain on the stack. It's header summary level will be determined and state set to Check Children (152) when completed (See Steps 3 and 4).

```
      /-1-\
      +-----+
      | HC |
      +-----+
```

Step 6
Check Children (176): All children are check (154) until there are no more children (153). The state is then set to Check Nested (155). This process is repeated until the dimension is full.

```
      /-1-\
      +-----+
      | CH |
      +-----+
```

Step 7
Check Nested (177): Determine if there are any Nested Dimensions (156). Fill the current dimension to the required depth with Nested Dimension Fillers (157) before moving onto the inner dimension (as in Step 2).

```
      /-------------1-------------\
      +-----+ +-----+ +-----+ +-----+
      | NE |  | NE |  | NE |  | NE |
      +-----+ +-----+ +-----+ +-----+
```

Step 8
Check Current (178): Once there are no more children (155) and no more nested dimensions (158), the next state is Check Current (158). Along with Check Header Current, these are the only two states that can produce a row back to the client. The summary level is determined (159), as per below. −1 indicates a detail row. 0 or above indicate a footer row. All other values indicate that this stack does not represent a desired row and the process continues.

```
      /-------------1-------------\    /-----2-----\
      +-----+ +-----+ +-----+ +-----+ +-----+ +-----+
      | NE |  | NE |  | NE |  | NE |  | NE |  | CU |
      +-----+ +-----+ +-----+ +-----+ +-----+ +-----+
```

Step 9
Check Siblings (179): This is a transitory state after the Check Current (158) is completed. The underlying MDDS Iterator is moved to the next sibling (160), a row copy is kept (161), and the state is set to Check Header Nested (162). If there are no more siblings (180 and 163) the state is set to Check Ancestor (166).

```
      /-------------1-------------\    /-----2-----\
      +-----+ +-----+ +-----+ +-----+ +-----+ +-----+
      | NE |  | NE |  | NE |  | NE |  | NE |  | SI |
      +-----+ +-----+ +-----+ +-----+ +-----+ +-----+
```

Step 10a (More Siblings)
Check Header Nested (181): The process starts over again at Step 1 (171 and 141).

```
      /-------------1-------------\    /-----2-----\
      +-----+ +-----+ +-----+ +-----+ +-----+ +-----+
      | NE |  | NE |  | NE |  | NE |  | NE |  | HN |
      +-----+ +-----+ +-----+ +-----+ +-----+ +-----+
```

Step 10b (No More Siblings)
Check Ancestor (182): A transitory state where the last element in the stack is deleted (165). It allows triggers the end of the dataset when there are no more elements left in the stack.

```
      /-------------1-------------\    /-----2-----\
      +-----+ +-----+ +-----+ +-----+ +-----+ +-----+
      | NE |  | NE |  | NE |  | NE |  | NE |  | AN |
      +-----+ +-----+ +-----+ +-----+ +-----+ +-----+
```

All Facts
If a report contains only fact columns (the "all facts" indicator is true), then the result set contains only a single row of data containing the various cell (measure) values from the multi-dimensional dataset.
There is no necessity of performing any traversal of dimension members, or the production of any summary rows.
No Facts
If a report contains no facts, it then only contains detail rows and no summary or header rows are produced. All row summary values indicate a detail row.
Multi-Dimensional Value to Column Values
Once a row of data has been identified for being appropriate for inclusion in the final result set, each member and property represented by the stack is matched, if possible, with its corresponding item in the result processing information generated by the translation module. If a matching item is found, this provides the information required to determine where an item appears in the final result set (i.e. column position).
Currently not handling 2 data source dimensions put into 1 (problem with additional summary values), nor splitting 1 into 2—missing expected summary values.

Cross Tabulated Results

In the case of a cross tabulated report, no transformations are applied to the actual data returned by the data source result set. However, it may be necessary to modify the metadata description of the result set itself so that it aligns with the semantics of the original query:

Change the names of the dimensions in the cases where:
   A dimension's name is different in the report.
   A single dimension is split into multiple report dimensions.
   Levels from multiple dimensions are merged into a single dimension.
Change the names of levels
Change the level numbers of individual members along an edge.

The report specification system 40, translation module 41, and result processing module 43 according to the present invention, and the methods described above, may be implemented by any hardware, software or a combination of hardware and software having the functions described above. The software code, either in its entirety or a part thereof, may be stored in a computer readable memory. Further, a computer data signal representing the software code that may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A system for processing a multidimensional (MD) data set produced from an execution of multidimensional query on a MD data source, the MD data set comprising data for a report described by a report specification based on an entity/relationship (ER) schema, the system comprising:
   a result set description generation module producing a result set description matching the semantics of the report specification based on the-ER schema from a MD data set description describing the semantics of the MD data set using result processing information;
   a tabular row generation module converting the MD data set into a collection of rows of data to generate a result set of the report output as a tabular result set when the ER report specification conforms to a tabular report, wherein the tabular row generation module generates each row of data by producing a respective full stack of members from the MD data set, wherein each full stack of members represents a row of data available for inclusion in the tabular result set, and wherein producing the full stack of members comprises:
      pushing a highest-level member of a dimension onto a stack,
      traversing parent/child relationships within a dimension along an edge to push each member at each level onto the stack,
      popping a top member off the stack, and
      pushing all siblings of the top member onto the stack;
   a cross-tabulated result generation module converting the MD data set into a cross tabulated result set when the report specification conforms to a cross-tabulated report
   a translation module converting the report specification based on the ER schema into the MD query; and
   an execution module for executing the MD query.

2. A computer-implemented method of processing a multidimensional (MD) data set produced from an execution of a multidimensional query on a MD data source, the MD data set comprising data for a report described by the report specification based on an entity/relationship (ER) schema, the method comprising:
   producing a result set description matching the semantics of the report specification based on the ER schema from a MD data set description describing the semantics of the MD data set using result processing information; and
   converting MD data set into a collection of rows of data to generate a result set of the report output as a tabular result set when the ER report specification conforms to a tabular report, wherein converting the MD data set into a collection of rows of data includes, producing respective full stacks of members, each full stack representing a row of data available for inclusion in the collection of rows of data, wherein producing given full stack of members comprises:
      pushing a highest-level member of a dimension onto a stack,
      traversing parent/child relationships within a dimension along an edge to push each member at each level onto the stack,
      popping a top member off the stack, and
      pushing all siblings of the top member onto the stack; and
   converting the MD data set into a cross tabulated result set when the report specification conforms to a cross-tabulated report.

3. The method as claimed in claim 2, further comprising creating a header row, including:
   setting a state of header to header nested;
   performing a check header nested;
   performing a check header current;
   performing a check header done;
   performing a check children;
   performing a check nested;
   performing a check current;
   performing a check sibling; and
   performing a check ancestor.

4. The method as claimed in claim 2, further comprising creating a header row, including:
   setting a state of an element to header nested;
   checking for nested dimensions until there are no more;
   setting the state of the element to check header current;
   filling the dimension with nested fillers;
   determining a summary level;
   setting the state of the element to header done;
   removing the nested dimension fillers;
   checking all children of the element until there are no more children;
   setting the state of the element to check nested;
   determining if there are any nested elements;
   filling a current dimension with nested dimension fillers;
   setting the state of the element to check siblings;
   moving the MDDS iterator to the next sibling;
   keeping a row copy; and
   setting the state to check ancestor.

5. The method as claimed in claim 4, further comprising:
   indicating a row has been found if the summary level is >=0;
   deleting an element if there are other check header current states in the stack; and
   setting the state to check header nested if there are more siblings in the state.

6. A non-transitory computer-readable storage medium having computer readable code embodied therein for use in the execution in a computer of a method of processing a multidimensional (MD) data set produced from an execution of a multidimensional query on a MD data source, the MD data set comprising data for a report described by a report specification based on an entity-relationship (ER) schema, the method comprising:

producing a result set description matching the semantics of the report specification based on the ER schema from a MD data set description describing the semantics of the MD data set using result processing information;

converting MD data set into a collection of rows of data to generate a result set of the report output as a tabular result set when the ER report specification conforms to a tabular report, wherein converting the MD data set into a collection of rows of data includes, producing respective full stacks of members, each full stack representing a row of data available for inclusion in the collection of rows of data, wherein producing given full stack of members comprises:

pushing a highest-level member of a dimension onto a stack,         traversing parent/child relationships within a dimension along an edge to push each member at each level onto the stack,         popping a top member off the stack, and         pushing all siblings of the top member onto the stack; and     converting the MD data set into a cross tabulated result set when the report specification conforms to a cross-tabulated report.

7. A non-transitory computer-readable storage medium for use in the execution in a computer a system for processing a multidimensional (MD) data set produced from an execution of multidimensional query on a MD data set comprising data for a report described by a report specification based on an entity/relationship (ER) schema, the computer program product comprising:

a result set description generation module producing a result set description matching the semantics of the report specification based on the-ER schema from a MD data set description describing the semantics of the MD data set using result processing information;

a tabular row generation module converting the MD data set into a collection of rows of data to generate a result set of the report output as a tabular result set when the ER report specification conforms to a tabular report, wherein the tabular row generation module generates each row of data by producing a respective full stack of members from the MD data set, wherein each full stack of members represents a row of data available for inclusion in the tabular result set, wherein producing given full stack of members comprises:

pushing a highest-level member of a dimension onto a stack,         traversing parent/child relationships within a dimension along an edge to push each member at each level onto the stack,         popping a top member off the stack, and     pushing all siblings of the top member onto the stack;

a cross-tabulated result generation module converting the MD data set into a cross tabulated result set when the report specification conforms to a cross-tabulated report     a translation module converting the report specification based on the ER schema into the MD query; and     an execution module executing the MD query.

8. The system as claimed in claim 1, wherein the tabular row generation module further comprises:

a tabular summary level calculation module producing a header row to include in the row of data.

9. The system as claimed in claim 8, wherein the result processing information provides a mapping between objects within the ER schema and MD data source.

\* \* \* \* \*